United States Patent [19]

Bogwitz et al.

[11] Patent Number: 4,543,054
[45] Date of Patent: Sep. 24, 1985

[54] THERMOFORMING MACHINE

[75] Inventors: Wolfram E. R. Bogwitz; Anthony E. Flecknoe-Brown; Naum Duchovni, all of Melbourne, Australia

[73] Assignee: Hitek Limited, Victoria, Australia

[21] Appl. No.: 614,098

[22] Filed: May 25, 1984

[51] Int. Cl.[4] .............................................. B29C 17/02
[52] U.S. Cl. .................................... 425/335; 425/370; 425/396; 425/398
[58] Field of Search ............... 425/335, 336, 363, 369, 425/370, 371, 383, 396, 398, 400

[56] References Cited

U.S. PATENT DOCUMENTS

| | | | |
|---|---|---|---|
| 1,226,650 | 5/1917 | Ford | 425/370 X |
| 2,642,013 | 6/1953 | Enoch | 425/373 X |
| 3,351,977 | 11/1967 | Gasch et al. | 425/335 X |
| 3,568,245 | 3/1971 | Jetzer | 425/372 X |
| 3,744,952 | 7/1973 | Bequet et al. | 425/336 |
| 3,751,541 | 8/1973 | Hegler | 425/396 X |
| 3,792,952 | 2/1974 | Hamon | 425/336 X |
| 3,887,318 | 6/1975 | De Mets | 425/335 X |
| 3,888,618 | 6/1975 | Jones | 425/336 X |
| 3,981,663 | 9/1976 | Lupke | 425/396 X |
| 4,005,970 | 2/1977 | Leloux | 425/336 X |
| 4,226,580 | 10/1980 | Lupke et al. | 425/336 X |
| 4,449,910 | 5/1984 | Leloux | 425/370 X |
| 4,498,944 | 2/1985 | Krause et al. | 425/336 X |

Primary Examiner—J. Howard Flint, Jr.
Attorney, Agent, or Firm—Cushman, Darby & Cushman

[57] ABSTRACT

A machine and process for continuously thermoforming molten thermoplastic sheet are provided requiring precise synchronism in the interaction between opposed successions of circulatable tooling steps. A single motor for all the driving mechanisms achieves the desired synchronism and a driven succession of tooling steps itself drives the opposed succession.

7 Claims, 5 Drawing Figures

THERMOFORMING MACHINE

This invention relates to a machine which, by counter thrust of opposed mechanical recirculating tools, continuously stretch forms heat-softened thermoplastic sheet and to a continuous thermoforming process which may be performed by machines of the type described.

A substantial amount of prior work has been done in this area but the closest prior art of which we are aware is that described, for example, in the specification for granted Canadian Pat. No. 1,162,015, owned by the assignee of the present invention. The invention described in this prior specification includes a machine for continuously thermoforming a sheet of heat-softened thermoplastic material wherein two opposed and spaced successions of continuously circulatable tooling steps converge at an entry throat for said sheet to move said sheet from the throat through a dwell section in which the tooling steps move in opposed parallel relationship to a product removal section in which the tooling steps diverge and formed product is removed from the machine, characterised in that the tooling steps are of sufficient width to carry two or more rows of tools extending across the direction of sheet movement, said tooling steps while in contact with the sheet in the throat being operatively associated with means acting simultaneously to constrain the tooling steps (i) to remain in parallel alignment of the direction of sheet movement through the dwell section, (ii) to apply thrust in opposed directions normal to said direction of sheet movement, and (iii) to maintain opposed tooling steps in alignment relative to each other in the direction of sheet movement.

Canadian Pat. No. 1,162,015 also describes a process which is effective to substantially reduce the step defects which have been encountered in previous attempts to provide for continuous thermoforming of sheet materials. The step defect problem is more fully described in the Canadian specification to which reference should be made for further appreciation of this problem and of the proposals which were made in that prior specification to overcome it.

It has now been found however that while the machine and process described in Canadian Pat. No. 1,162,015 are substantially effective in achieving the desired elimination of step defects, the problem is still encountered, particularly if the prior machine is inefficiently operated. Thus the staybar drive system of Specification 1,162,015 has been found deficient in several areas. Firstly the clearances within the chain and sprocket drive system for the staybars lead to difficulties in maintaining the same speed and synchronous movement between the staybars on opposite sides of the machine. Secondly, the drive and support sprockets for the staybars themselves have been found difficult to keep in step with each other. A further difficulty arises from the clearances between the staybars and the cam followers on the tooling steps. The cam follower guiding each tooling step and transferring the load applied to each step is a further point where lack of precision can produce step defects in the product.

It is an object of the present invention to more fully overcome the step defect problem and to provide both a machine for this purpose.

It has now been found that the movement of the tooling step successions must be precisely synchronized if the residual step defect problem is to be overcome.

Accordingly the present invention provides an apparatus to carry out a process for the continous thermoforming of a sheet of thermoplastic material including driving opposed successions of tooling steps each carrying an array of forming tools in the same forward direction and in converging, then parallel paths, feeding a sheet of thermoplastic material heat-softened until it is molten between the forming tools adjacent the start of the convergence of the step paths, controlling the relative approach and forward movement of the tooling steps so as to bring the opposed forming tools into contact with the sheet and progessively form the sheet by counter thrust between the opposed tools, drawing the sheet between the converging and parallel paths of the tooling steps and simultaneously forming the sheet in accordance with the configuration of the forming tools, the formed sheet being maintained at a sufficiently high temperature, at least within the converging paths of the tooling steps, to permit any defects in the shape of the formed sheet which result from the stepwise action of the successive tooling steps to be removed by dispersion of the tensions in the sheet before the sheet cools below its softening temperature, characterised in that the opposed successions of tooling steps are driven in precise synchronism with each other.

The present invention also provides a machine for continuously thermoforming a sheet of heat-softened thermoplastic material wherein two opposed and spaced successions of continuously circulatable tooling steps converge at an entry throat for said sheet to move said sheet from the throat through a dwell section in which the tooling steps move in opposed parallel relationship to a product removal section in which the tooling steps diverge and formed product is removed from the machine, the said tooling steps being of sufficient widths to carry two or more rows of tools extending across the direction of sheet movement and said tooling steps while in contact with the sheet in the throat being operatively associated with means acting simultaneously to constrain the tooling steps (i) to remain in parallel alignment of the direction of sheet movement through the dwell section, (ii) to apply thrust in opposed directions normal to said direction of sheet movement, and (iii) to maintain opposed tooling steps in alignment relative to each other in the direction of sheet movement, characterised in that driving mechanisms incorporating a drive sprocket and controlling the movement of each opposed succession of tooling steps are interrelated so as to maintain said tooling steps in precise synchronism with each other irrespective of any minor variation in speed arising from cosine error in the drive sprocket.

Preferably the driving mechanisms include at least one drive chain for one succession of the tooling steps, a single drive system for all the driving mechanisms by which the or each said drive chain is driven, and the tooling steps from said one succession driving directly the opposed succession of tooling steps. The driving mechanisms of this type may include at least one chain engaging bar on each tooling step adapted to engage with an associated drive chain. The engagement of the chain engaging bar with the associated drive chain is such that the bar may move freely within the open links of the drive chain in a direction substantially perpendicular to the longitudinal plane of the link.

The engagement between the chain engaging bars and the open links of the drive chain allows free perpendicular movement of the bar and the tooling step of which it forms a part. The roller bearing action of the chain link pins reduces the friction between the chain engaging bar and its associated link. This mechanism also links the driving device (the drive chain) directly with the driven member (the tooling step) and thus reduces the number of interfaces where manufacturing and operating tolerances occur and create difficulties in maintaining precise synchronism.

The drive chain used is preferably a multiple strand roller chain having at least two strands of roller chain linked with their connecting pins in transverse alignment, at least one strand of the roller chain running free of engagement with drive or idler sprockets and at least one chain engaging bar on each tooling step being continuously engaged between the rollers of a link of such a free-running strand. In the preferred drive mechanism of the invention a continuous loop of multiple strand chain is supported at each end by twin sprocket wheels engaging the links in the two outer strands of the multiple strand chain and at least one inner strand of the chain remains free and is adapted to accommodate the chain engaging bars from the tooling steps.

However, while the chain engaging bars are generally preferably accommodated within at least one inner strand of a multiple strand drive chain (particularly where heavier forming loads are required), some applications may make the use of an outer strand or strands desirable. For example, use of the outer strand(s) has been found desirable where increased movement of the chain engaging bars towards the centre of the drive chain loop is required and one must avoid contacting the axle joining the drive chain sprocket wheels.

As indicated above, the or each drive chain is driven by a single drive system to provide the desired maintenance of precise synchronism between the opposed successions of tooling steps. In a preferred form of machine constructed in accordance with the invention, multiple strand drive chains on opposite sides of the machine are driven by a single motor through a drive axle having twin sprockets adjacent each end to drive the drive chains on each side of the machine. Similar sprockets on an idler axle at the opposite end of the machine support the opposite ends of the drive chains. In this form of machine, each tooling step has a chain engaging bar adjacent each opposite end adapted to engage with the drive chain at its side of the machine.

The drive chain(s) function not only to move the tooling step succession but also to restrain and partly to guide each tooling step. As indicated above, the chain engaging bars may move freely within their associated chain link rollers but are nevertheless restrained by the link rollers against substantially lateral movement in the plane of the link. The drive chain(s) also assist in guiding the tooling steps in a closed loop path. However additional means are provided to restrain and guide the tooling steps.

Accordingly the machine of the invention preferably includes a continuous loop of track for each tooling step succession. The track is designed to cooperate with cam followers on the tooling steps to apply the constraints noted above to the tooling steps while they are in contact with the sheet being formed, and to return the tooling steps successively to the throat of the machine. Thus, the track determines the path followed by each succession of tooling steps and the alignment of each tooling step in relation to the sheet in its movement through the machine.

To maintain precise fluctuation free synchronism of the driven succession of tooling steps with the opposed succession, the driven tooling steps themselves drive the tooling steps in the opposed tooling step succession. This may be achieved by incorporating a truck engaging bar on each driven tooling step which is adapted to engage a cam follower on the associated tooling step of the opposed tooling step succession and to drive the opposed tooling steps and their associated restraining and guiding mechanisms in precise synchronism with the driven succession of tooling steps.

Preferably the restraining and guiding mechanisms associated with the opposed tooling steps are of similar construction to the restraining and guiding mechanisms associated with the driven tooling steps. Thus, the opposed tooling steps preferably themselves drive, and are restrained and guided by, a multiple strand roller chain. This chain is mounted on follower sprockets and is driven by the engagement in at least one free strand of the chain of chain engaging bars on the tooling steps of the opposed tooling step succession.

The invention may be more fully understood by reference to the accompanying drawings in which.

Figure 1:
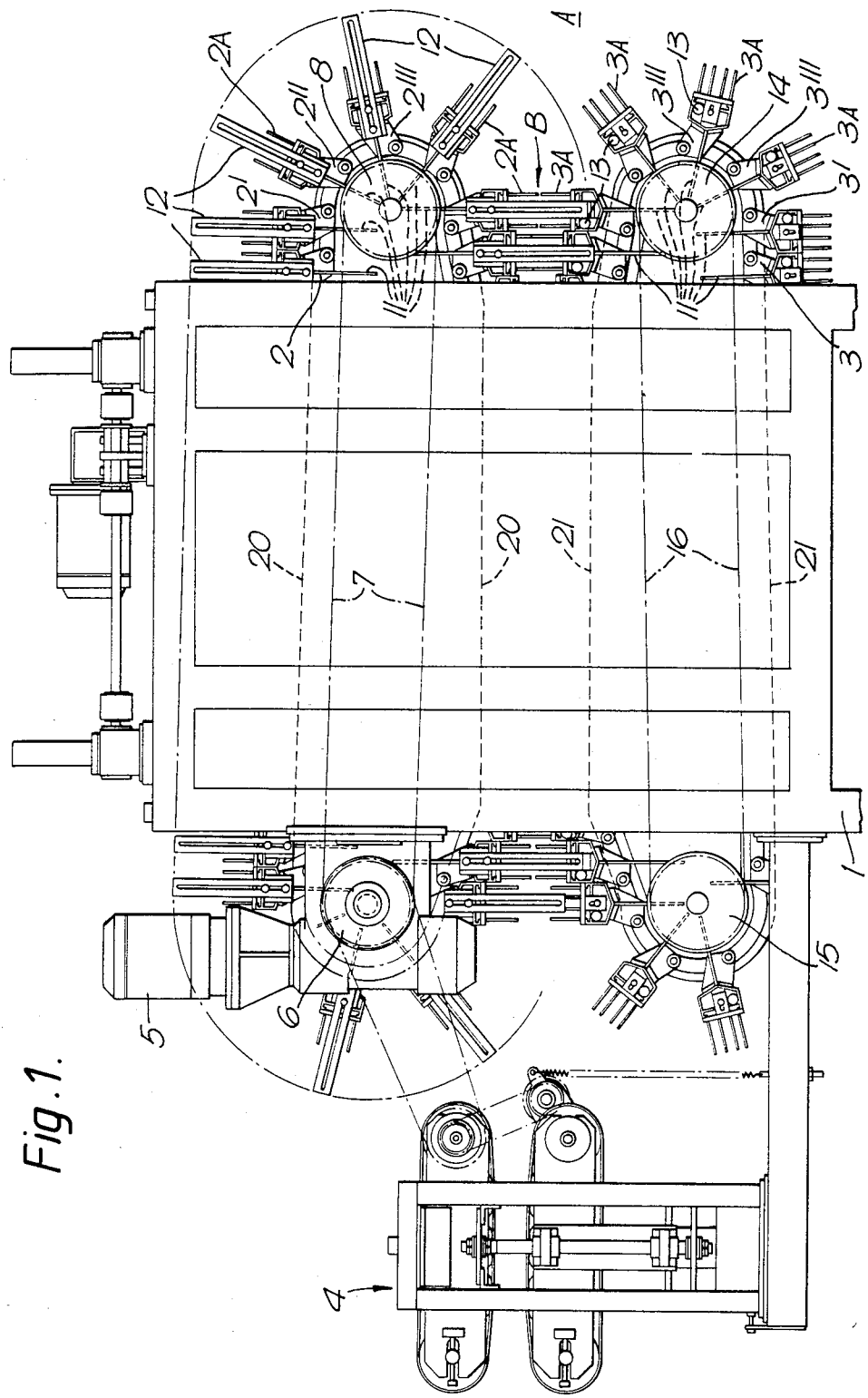
FIG. 1 is a side view of a machine constructed in accordance with the present invention.
Figure 2:
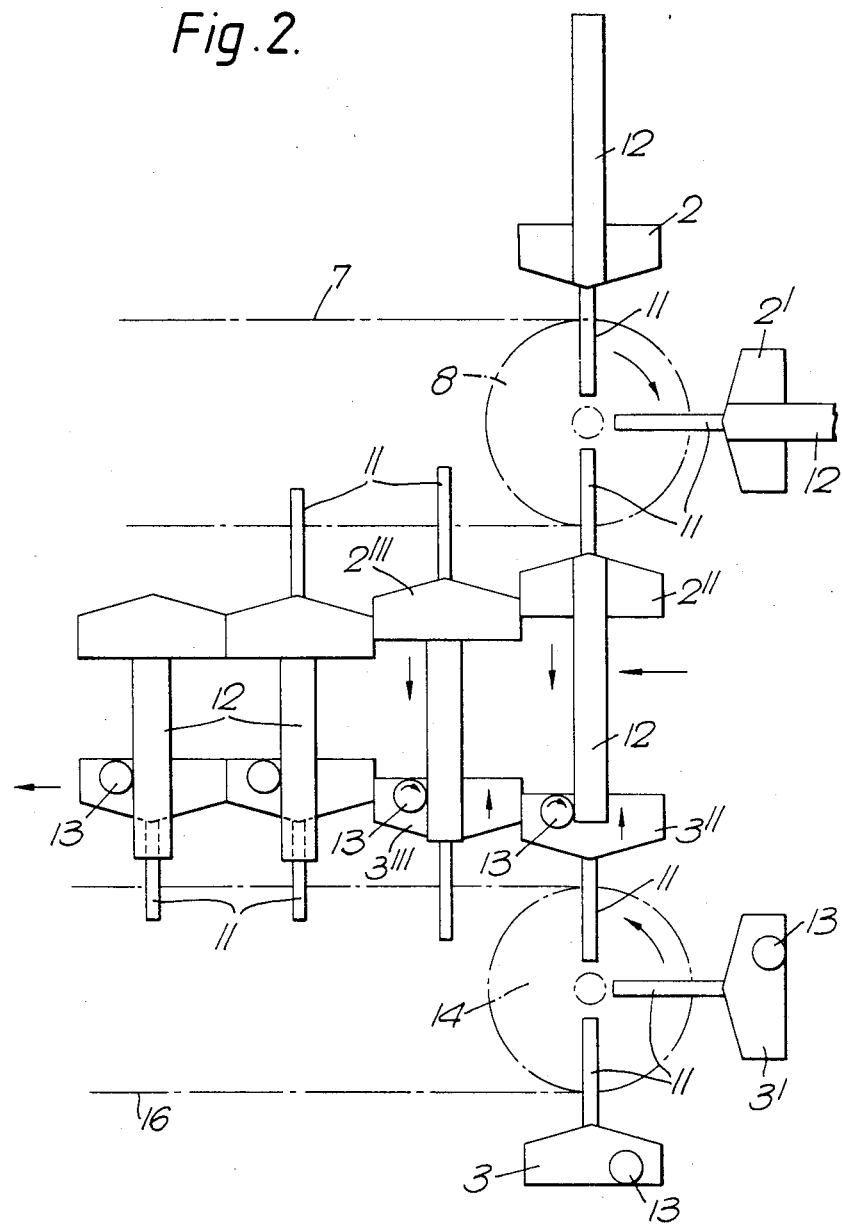
FIG. 2 is a diagrammatic side view at one end of the machine shown in FIG. 1.

Referring firstly to FIGS. 1 and 2 the thermoforming machine includes a support frame 1 carrying opposed successions of tooling steps 2, 2', 2", etc. and 3, 3', 3", etc. Both opposed successions of tooling steps contain the required number of tooling steps which, when working in opposition, will provide with their associated tools 2A, 3A (FIG. 1 only) for the desired forming of the thermoplastic sheet passed through the thermoforming machine.

The thermoplastic sheet is entered in substantially molten condition into the throat of the machine at the end A illustrated in FIG. 1, contacts the forming tools at point B and is carried by the forming tools through the dwell of the machine and has its removal from the machine for possible further processing assisted by a removal mechanism which may be of the type generally indicated by reference 4.

The single drive motor 5 for the machine is shown as driving the upper succession of tooling steps through sprocket wheel 6 and an associated drive chain (not shown). The path of the drive chain driven by sprocket 6 is shown at 7 and will be seen to pass over idler sprocket 8 at the inlet end of the machine.

Also visible in FIG. 1 are the outer ends of trucks which are preferably located at each end of the tooling steps. The tooling trucks are more fully illustrated in FIGS. 3 and 4 and will be described in greater detail with reference to these figures. However, it may be noted that each truck includes a driven section 9 and a tracking section 10. Each driven section includes a chain engaging bar 11 adapted to engage within the free links of the drive chain. The driven section on the trucks of the upper succession of tooling steps further includes a truck engaging bar 12 and it will be seen that prior to the entry throat of the machine the truck engaging bar 12 contacts a cam follower 13 on the driven section of the trucks in the opposed succession of tooling steps.

The lower or opposed succession of tooling steps is thus driven by the tooling steps in the upper succession. As will be seen, the lower succession of tooling steps is controlled by its co-operation with a follower chain which passes around follower sprocket wheels 14 and 15. The path of the follower chain is indicated by reference 16.

Figure 3:
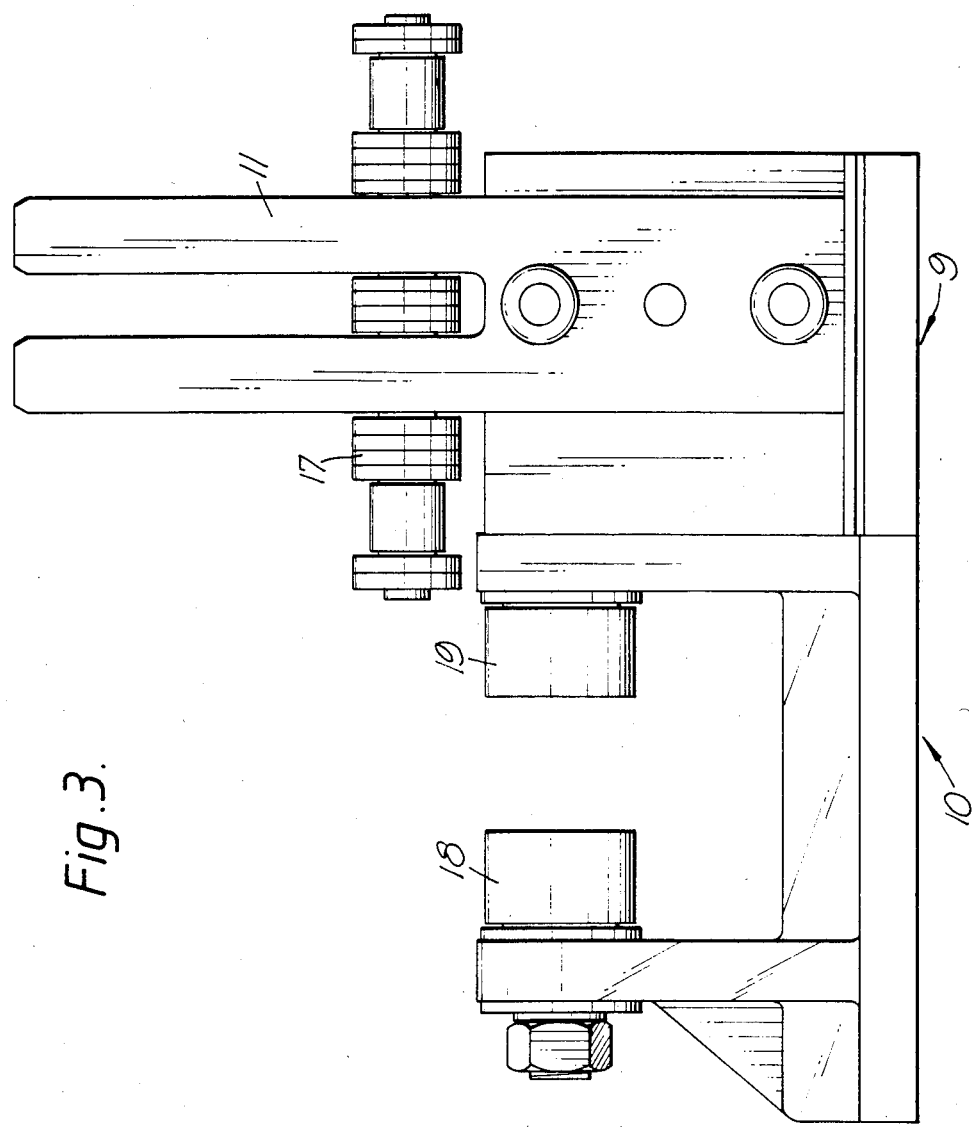
FIG. 3 is an end view showing the operative mechanisms at one end of a tooling step.
Figure 4:
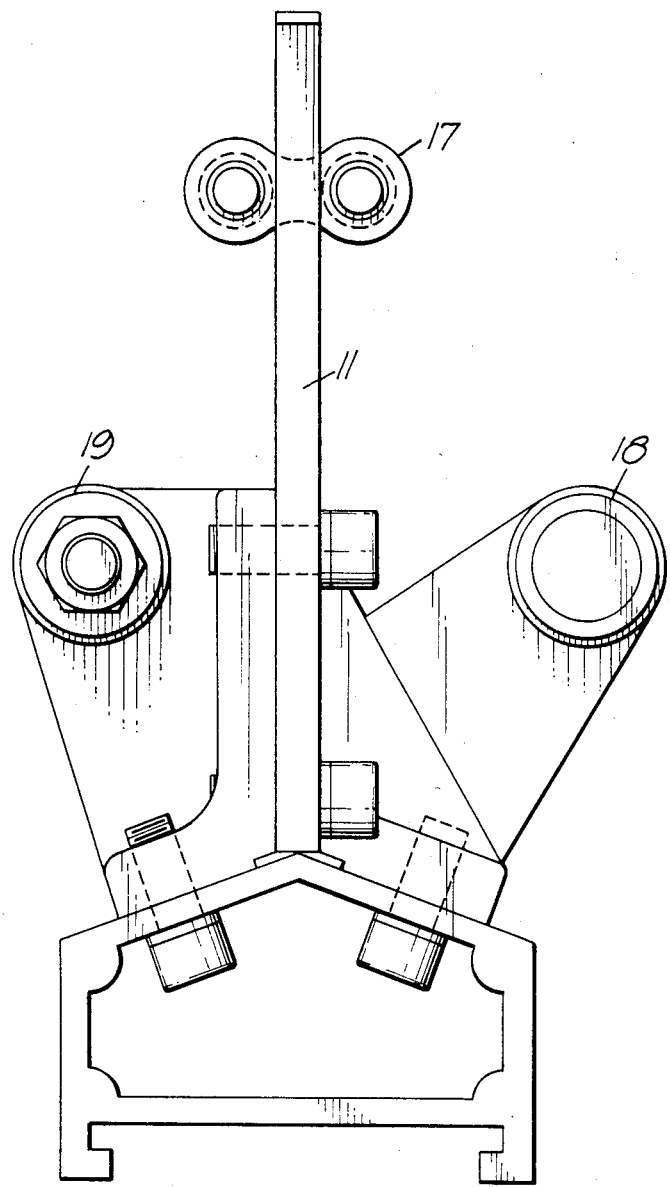
FIG. 4 is a side view of a tooling step.

While the co-operation of the chain engaging bar and the free links in the multiple strand roller chain limits backward and forward and side to side movement of the tooling step, it allows movement perpendicular to the plane of the chain links to be varied by the interaction of appropriate guide tracks mounted in the body of the machine and cam followers which form part of the tracking section of the tool trucks. Referring now to FIGS. 3 and 4 the location of and working interaction between the chain engaging bar 11 and the drive chain 17 is indicated and longitudinally displaced cam followers 18, 19 on the tracking section 10 of the tool truck are illustrated. In operation of the machine, co-operation between the cam followers on the tool truck and a guide track of the desired configuration will allow for the desired entry and exit angles. The path followed by the successive tooling steps is illustrated in FIGS. 1 and 5 on the lines marked with references 20 and 21.

Figure 5:
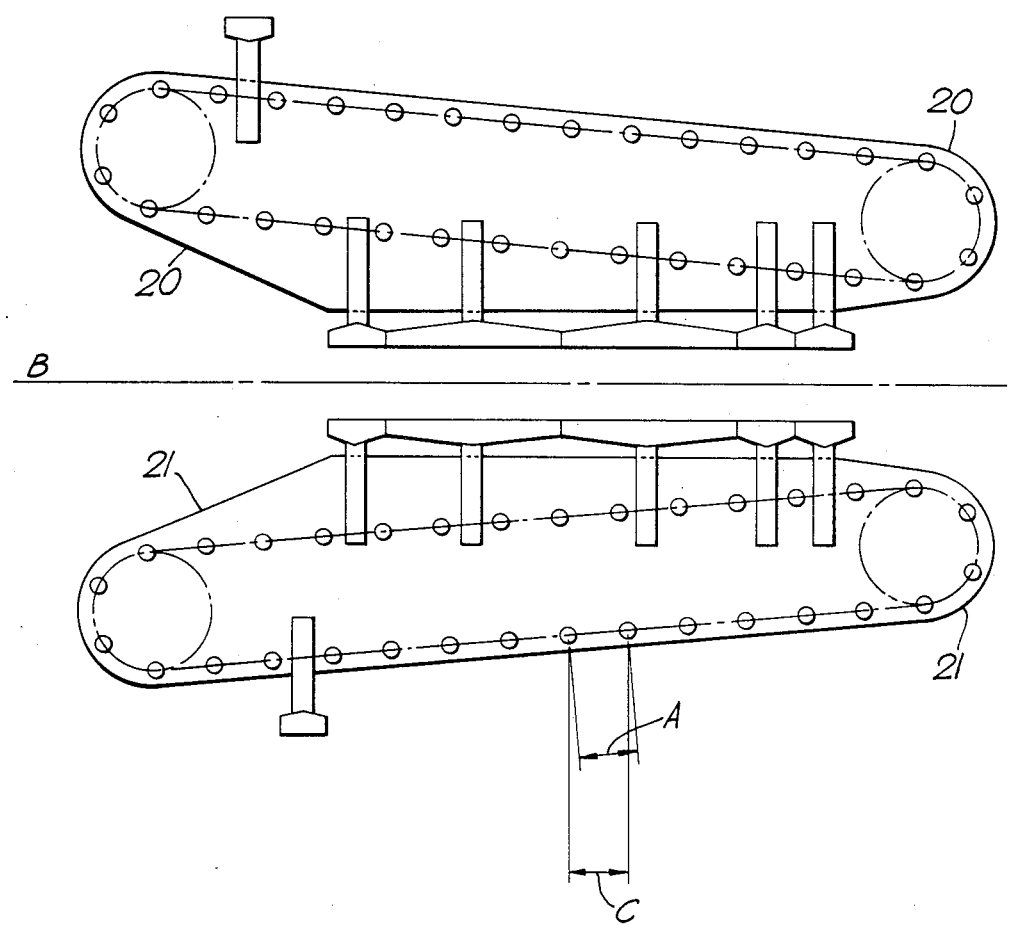
FIG. 5 is a diagrammatic side view showing opposed tooling step successions.

The paths 20 and 21 of the tooling step successions are more clearly illustrated in diagrammatic FIG. 5. In this figure the ability of the drive chains to accommodate tooling steps of different widths is illustrated. The width of the tooling steps may thus be a multiple of the width determined by the pitch of the drive chain. Although not illustrated, the control of the tooling step movement provided by the present invention also makes it unnecesary for successive tooling steps to abut. This allows further variation in product design.

It may also be noted from FIGS. 1 and 5 that the tooling steps in the upper and lower successions diverge more rapidly at the exit end of the machine than they converge at the entry end. This allows for full removal of the tools from the formed product.

Preferably the relative angle between the upper and lower tooling successions can be varied for desired variations in the pitch of the repetitive pattern in the product being formed and thus step elements of different sizes may be fitted to a machine. FIG. 5 shows that the fixed chain pitch "A" can effectively be varied by movement of the chains relative to the centreline of the sheet movement "B", thus varying the projected pitch "C". This facility is particularly useful as drive chains are commonly available only in British Imperial measurements which limits the pitch of the repetitive patterns which may be obtained. However, by varying the projected pitch "C", one can select whatever pattern pitch is desired. This allows the use of metric step widths (for example 100 mm with Imperial measure chain of four inches (101.6 mm)). The mechanisms of the present invention allow for such variation by relative movement between the adjacent ends of the tooling successions and such movement does not affect the synchronization between the two tooling successions. This is an important advantage in manufacturing metric sized products.

The guide tracks mounted within the machine cooperate with the tracking section cam followers to maintain the relative vertical positions of the tooling steps. The cam followers on the tracking section constrain the tooling step directly to follow the track path and do not rely on the transmission of any secondary motion or actuation for this purpose. The force required to form the product from the thermoplastic sheet is thus transmitted directly from the track, through the cam followers which form part of the tooling step.

In addition to the benefits of precise synchronization between the opposed successions of tooling steps and of accurate control of tool movements, the mechanisms of the present invention provide further advantages over the prior art. Thus the preferred chain drive and control mechanism allows for variation in the width and/or number of active trucks (measured in the direction of machine movement) by engagement of the chain engaging bars in selected openings only of the free chain strand. Variation in the relative lateral location of the tool components may also be readily accommodated. The mechanisms also permit ready access from the side of the machine for the application of fluid lines allowing more versatile heating, cooling and/or vacuum applications.

The machine of the present invention employs a driving mechanism which exerts positive control on all tooling steps at the same time. The positive control of the drive chain, transmitted through the driven tooling steps to the tooling steps in the opposed succession, and the restraint and guidance of both the drive chain and the follower chain are maintained irrespective of the movement of the tooling steps in following the guide track and irrespective of the rate of forming or solidification of product.

Having now described our invention what we claim is new and desired to secure to letters patent is:

1. A machine for continuously thermoforming a sheet of heat-softened thermoplastic material wherein two opposed and spaced successions of continuously circulatable tooling steps converge at an entry throat for said sheet to move said sheet from the throat through a dwell section in which the tooling steps move in opposed parallel relationship to a product removal section in which the tooling steps diverge and the formed product is removed from the machine, the said tooling steps being of sufficient widths to carry two or more rows of tools extending across the direction of sheet movement and said tooling steps while in contact with the sheet in the throat being operatively associated with means acting simultaneously to constrain the tooling steps (i) to remain in parallel alignment of the direction of sheet movement through the dwell section, (ii) to apply thrust in opposed directions normal to said direction of sheet movement, and (iii) to maintain opposed tooling steps in alignment relative to each other in the direction of sheet movement, characterised in that driving mechanisms incorporating a drive sprocket and controlling the movement of each opposed succession of tooling steps are interrelated so as to maintain said tooling steps in precise synchronism with each other irrespective of any minor variation in speed arising from cosine error in the drive sprocket.

2. A machine as claimed in claim 1 wherein said driving mechanisms include at least one drive chain for one succession of tooling steps, a single drive system for all the driving mechanisms by which the or each said drive chain is driven, and the tooling steps from said one succession driving directly the opposed succession of tooling steps.

3. A machine as claimed in claim 2 wherein the or each said drive chain is a multiple strand roller chain having at least three strands of roller chain linked with their connecting pins in transverse alignment, at least one strand of the roller chain running free of engagement with drive or idler sprockets and at least one chain engaging bar on each tooling step being continuously engaged between the rollers of a link of such a free-running strand.

4. A machine as claimed in claim 3 wherein each driven tooling step includes a truck engaging bar adapted to engage a cam follower on the associated tooling step of the opposed tooling steps succession and to drive the opposed tooling steps and their associated restraining and guiding mechanism in precise synchronism with the driven succession of tooling steps.

5. A machine as claimed in claim 4 wherein each tooling step includes at least one tracking section having cam followers restrained within and guided by a track which determines the path followed by each associated succession of tooling steps and the alignment of each tooling step in relation to the sheet in its movement through the machine.

6. A machine as claimed in claim 5 wherein means are included to vary the relative angle between the opposed tooling successions whereby tooling steps of alternative widths determined by the pattern pitch in a desired product may be used.

7. A machine as claimed in claim 5 wherein the tooling steps in each opposed tooling step succession are of different widths each said step being a width determined by the pitch of the drive chain or a multiple of this determined width.

* * * * *